Jan. 15, 1963 L. L. TRIBBY 3,073,968
PEAK DETECTOR WITH DUAL FEEDBACK AUTOMATIC GAIN ADJUSTING MEANS
Filed March 9, 1960
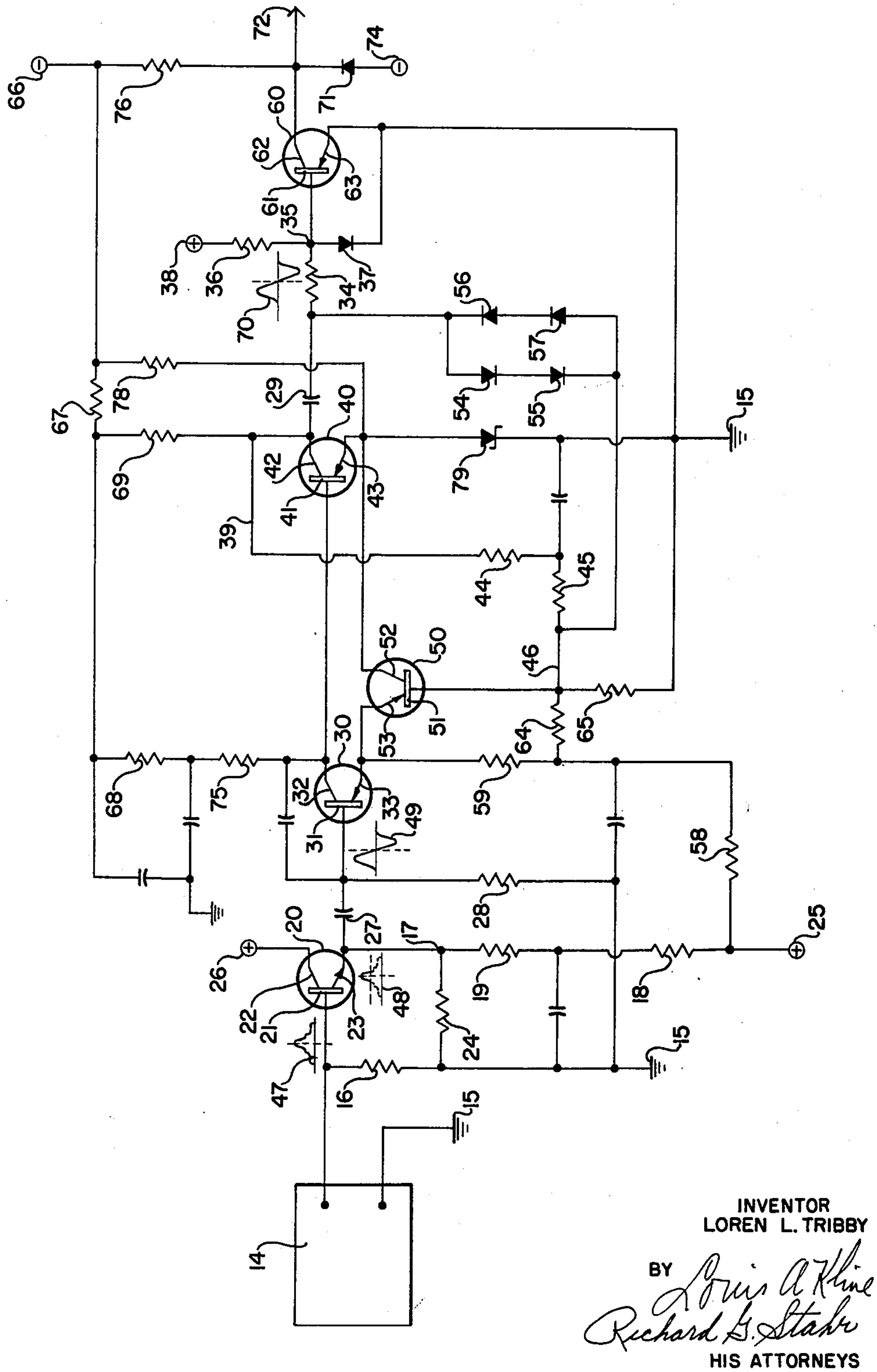
INVENTOR
LOREN L. TRIBBY
BY Louis A. Kline
Richard G. Stahr
HIS ATTORNEYS United States Patent Office 3,073,968

Patented Jan. 15, 1963

3,073,968

PEAK DETECTOR WITH DUAL FEEDBACK AUTOMATIC GAIN ADJUSTING MEANS

Loren L. Tribby, West Carrollton, Ohio, assignor to The National Cash Register Company, Dayton, Ohio, a corporation of Maryland Filed Mar. 9, 1960, Ser. No. 13,852
2 Claims. (Cl. 307—88.5)

The present invention relates to peak detector devices, and, more specifically, to devices of this type which are adapted to detect asymmetrical direct current electrical signals.

With a variety of applications, particularly in the digital data processing field, information may be stored in the form of pulses recorded upon a magnetic recording medium. Heretofore, it has been common practice to employ a signal amplitude sensitive device for the purpose of detecting the recorded pulses as the recording medium is passed by or moved relative to a reading device. While with certain applications this method has been satisfactory, it has been found to be inadequate with high recording densities, in view of the large variations in wave shapes and amplitudes. To remedy this serious disadvantage in regard to the detection of high density recording, devices have been developed which are sensitive to peak values for the purpose of detecting the stored pulses.

As the use of high density magnetic recording is becoming increasingly widespread, the requirement of a reliable peak detector device, simple in operation and economical to manufacture, is apparent.

It is, therefore, an object of this invention to provide an improved peak detector.

It is another object of this invention to provide an improved peak detector device arranged to be sensitive to the peak values of asymmetrical, direct current electrical signals.

In accordance with this invention, a peak detector device is provided wherein input asymmetrical direct current electrical signals are differentiated and amplified in a two-stage, cascade-coupled, amplifier. Included in the input circuit of the first amplifier stage is a potential sensitive control circuit device for automatically adjusting the gain of the first amplifier stage, in response to variations of output potential from the second amplifier stage. A first feed-back circuit and a second feed-back circuit apply at least a portion of the potential appearing across the second amplifier stage and the output of the second amplifier stage, respectively, to the potential sensitive control circuit, so that the gain of the amplifier may be maintained within prescribed limits, regardless of input potential signal levels. Connected to the output circuit of the second amplifier stage is a polarity sensitive detector device arranged to produce an output signal pulse as the amplified differentiated signals reverse polarity.

For a better understanding of the present invention, together with further objects, advantages, and features thereof, reference is made to the following description and accompanying single-figure drawing.

Referring to the drawing, a source of asymmetrical direct current electrical signals 14 is indicated in block form, since the details form no part of this invention and may be, for example, any one of several magnetic reading devices well known in the art. To provide improved reliability, the peak detector device of this invention may be provided with a potential level sensitive circuit which is arranged to translate only those input signal potential levels which exceed a predetermined magnitude. While this circuit may be of any suitable design, it has been herein indicated as a type NPN transistor 20, having the usual base 21, collector 22, the emitter 23 electrodes. One of the output terminals of signal source 14 is directly connected to the base 21 of transistor 20, while the other output terminal may be connected to point of reference potential 15, as indicated. The base 21 of transistor 20 is maintained at substantially ground bias potential through resistor 16, while the emitter 23 bias potential is positive, being taken off point 17 along a voltage divider network composed of series resistors 18, 19, and 24 connected between a source of positive potential 25 and point of reference potential 15. Because the base 21 of transistor 20 is biased negatively in respect to the emitter 23, a condition which does not satisfy the base-emitter bias requirements for conduction through a type NPN transistor, transistor 20 is normally in a cut-off condition, although it is biased for normal operation by the positive potential applied to its collector 22 from source of positive potential 26.

The output of transistor 20 is taken from its emitter electrode 23 and applied to a circuit which differentiates the signals translated therethrough. This circuit may be of the common capacitance-resistance type and is composed of capacitor 27 and resistor 28.

To amplify the differentiated signal to a suitable level, a two-stage amplifier circuit, connected in cascade, is employed, and is composed of type PNP transistors 30 and 40, each having the usual base 31 and 41, collector 32 and 42, and emitter 33 and 43 electrodes, respectively. In each of these transistor amplifiers, the emitter electrodes are the common electrodes, the base electrodes are the input electrodes, and the collector electrodes are the output electrodes. While these amplifier stages have been indicated as being transistors, it is to be specifically understood that other suitable amplifying devices may also be employed. Transistor 40 is biased for normal operation by a negative potential from negative potential source 66 applied to the collector 42 through series resistor 67 and load resistor 69. The emitter 43 bias potential is taken from a point between resistor 78 and Zener diode 79 connected between source of negative potential 66 and point of reference potential 15. Although this potential is of a negative polarity, because of the drop across the base-emitter junction it is of a magnitude which is more positive than that of the base 41. As this condition satisfies the base-emitter bias requirement for conduction through a type PNP transistor, transistor 40 is normally conducting. So that the gain of the amplifier stages may be automatically adjusted in response to variations in output potential, the biasing arrangement of the several electrodes of the first stage amplifier transistor 30 is somewhat different from that generally employed with amplifier circuits of this type. Zener diode 79 in the emitter circuit of transistor 40 determines the operating level of transistor 30. With transistor 40 conducting, the base 41 assumes a slightly more negative potential by an amount determined by the drop across the base-emitter junction. In view of the direct connection between the base 41 of transistor 40 and the collector 32 of the transistor 30, collector 32 assumes the potential of base 41. As this potential is of a negative polarity, transistor 30 is biased for normal operation. A potential sensitive control circuit is included in the common or emitter electrode 33 circuit of the first amplifier stage transistor 30 and may comprise a type PNP transistor, 50, having the usual base 51, collector 52, and emitter 53 electrodes. The collector 52 of transistor 50 is connected to the emitter 43 side of Zener diode 79. As the potential at this point is negative, transistor 50 is biased for normal operation. To provide bias potentials for the base 51 and emitter 53 electrodes of transistor 50, a potential divider network comprising series resistors 58, 64, and 65 is connected between a source of positive potential 25 and point of reference potential 15. The emitter 53 bias potential is taken from a point between resistors 58 and 64 along this divider network, while the base 51 bias potential is taken from a point between resistors 64 and 65. With this arrangement, the base bias potential is more negative, or less positive, than the emitter bias potential, a condition which satisfies the base-emitter bias requirements for conduction through a type PNP transistor. Series resistor 59 in the emitter 53 circuit provides a degenerative feed-back potential which tends to maintain the conduction through transistor 50 constant with changes in operating conditions such as changes in ambient temperature, for example. With potential sensitive control circuit transistor 50 conducting, the emitter 53 assumes substantially the same potential as the base 51. As the emitter 33 of first-stage amplifier transistor 30 is connected directly to the emitter 53 of potential sensitive control circuit transistor 50, the emitter 33 of transistor 30 also assumes substantially the potential of the base 51 of transistor 50. This potential is of a positive polarity, and the magnitude is arranged to be of a value which will be more positive than the normal most positive extremes of input signal level applied to the base 31. As this condition satisfies the base-emitter bias requirements for conduction through a type PNP transistor, transistor 30 is normally conducting.

To provide an output signal with each peak value of asymmetrical input direct current potential signals, a detector device, which is arranged to produce an output signal pulse as the amplified differentiated signal reverses polarity, is provided. While this detector may be of any suitable type, it has been herein indicated as a type PNP transistor 60, having the usual base 61, collector 62, and emitter 63 electrodes. The base 61 of transistor 60 is coupled to the output or collector electrode 42 of the second stage amplifier transistor 40, through coupling capacitor 29 and series resistor 34. Transistor 60 is biased for normal operation by the negative potential of source 66 applied to the collector 62 through load resistor 76.

The base 61 of transistor 60 is biased from point 35 along a voltage divider network composed of resistor 36 and diode 37 connected between a source of positive potential 38 and point of reference potential 15. As this is the correct polarity to produce conduction through diode 37, the base of transistor 60 is substantially at ground potential. As emitter 63 of transistor 60 is also at substantially ground potential, a condition which does not satisfy the base-emitter bias requirements for conduction through a type PNP transistor, transistor 60 is normally in a cut-off condition although biased for normal operation.

So that at least a portion of the direct current potential of the output or collector electrode 42 of second-stage amplifier transistor 40 may be applied to the potential sensitive control circuit device transistor 50, a first feed-back circuit is provided and includes line 39, series resistors 44 and 45, and line 46 connected to the base electrode 51 of transistor 50.

To similarly apply at least a portion of the alternating current potential appearing across the output coupling circuit to the potential sensitive control circuit, a second feed-back circuit, including the series-parallel combination of diodes 54, 55 and 56, 57, is connected between the output of coupling capacitor 29 and the base 51 of transistor 50. As this output potential is an alternating current potential, the parallel combination of diodes is required, so that the complete cycle may be applied back to the base 51 of transistor 50. To increase the impedance of this circuit to tolerable levels for reasons to be brought out later, two series diodes in each parallel path may be required.

Upon the application of an asymmetrical positive going direct current electrical signal, which may take the form as indicated by wave-form 47, to the base 21 of potential level sensitive transistor 20, transistor 20 remains in its cut-off condition until a positive potential level of sufficient magnitude to bias the base 21 positive in respect to the emitter 23, a condition which satisfies the base-emitter bias requirements for conduction through a type NPN transistor, is reached. At this time, transistor 20 begins conduction and continues to conduct until the positive potential level magnitude falls below the point at which the base is biased positively in respect to the emitter, as indicated by wave-form 48. In this manner, small fluctuations in input potential levels which are created by minor line disturbances or noise in the magnetic pick-up head are of insufficient magnitude to trigger transistor 20 and, hence, are not admitted to the balance of the peak detector circuit of this invention.

The portion of the asymmetrical signal translated by potential level sensitive transistor 20, as indicated above the dashed line of wave-form 48, is differentiated by the differentiating circuit consisting of capacitor 27 and resistor 28. The wave shape present at the output of this differentiating circuit takes the form of wave-form 49.

Transistor 30 amplifies differentiated input signal 49, and the amplified signal appears across load resistor 75, from which it is applied directly to the base 41 of second-stage amplifier transistor 40.

The amplified differentiated wave-form is taken from coupling capacitor 29 and applied through series resistor 34 to the base 61 of detector transistor 60, normally biased to cut-off, as has previously been explained. During the positive portion of amplified differentiated wave form 70, the base 61 of transistor 60 is biased even more positive than the emitter 63 thereof; hence, transistor 60 remains cut off in that this does not satisfy the base-emitter bias requirements for conduction through a type PNP transistor. As amplified wave form 70 reverses polarity, the base 61 of transistor 60 is biased negatively in respect to the emitter 63, a condition which satisfies the base-emitter bias requirements for conduction through a type PNP transistor. As transistor 60 conducts, an output pulse appears across load resistor 76, which may be taken from output terminal 72 and applied to external circuitry, not shown. As the amplified differential wave form 70 returns through zero potential in the positive direction, the base 61 of transistor 60 is again biased positively in respect to its emitter 63, a condition which does not satisfy the base-emitter bias requirements for conduction through a type PNP transistor, thereby again cutting the transistor 60 off.

A study of wave-forms 47, 48, 49, and 70 indicates that the instant of reversal of polarity of the differentiated signal wave form is precisely the peak value of the asymmetrical direct current electrical signal input wave form. Therefore, the signal pulse produced by detector transistor 60, as the amplified differentiated wave form 70 reverses polarity, provides an indication of a peak value of an asymmetrical input direct current electrical signal wave-form. So that the output signal potential may be maintained below a predetermined level, a clamping diode 71 may be connected to its output circuit, in series with a source of negative potential 77.

In the event that the input signal wave-form attains a level of sufficient magnitude to drive the amplifying circuit transistors 30 and 40 into saturation and below cut-off, a distorted amplified wave-form will result. Because the cross-over point or point of reversal of polarity of this distorted differentiated wave-form may be considerably different in time from the cross-over point of an undistorted amplified differentiated wave form, intolerable error may result in that output pulses may appear at a time other than that at which an input direct current signal peak is present.

To remedy this, an alternating current feed-back circuit comprising the series-parallel combination of diodes 54, 55 and 56, 57 and a direct current feed-back circuit comprising series resistors 44 and 45 are provided for automatically adjusting the gain of transistor 30 in response to variations of output alternating current potential and collector 42 direct current potential, respectively. Amplified differentiated wave-form 70 is in phase with differentiated wave form 49. As wave-form 70 is going positive, a positive potential bias is applied to the base 51 of control circuit transistor 50 through series diodes 54, 55. This positive potential reduces the amount of conduction therethrough. As transistor 50 conducts less, the emitter 53 goes more positive, and, because of the direct connection, the emitter 33 of the transistor 30 also goes more positive. Because of the "in phase" relationship between wave-forms 49 and 70, the base 31 of transistor 30 is also going positive at this time but of a magnitude slightly more positive than that of the emitter 33. Therefore, the potential difference between the base 31 and the emitter 33 becomes less, resulting in a reduction in the gain of transistor 30. As wave-form 70 is going negative, a negative potential bias is applied to the base 51 of control circuit transistor 50 through diodes 56 and 57. This negative bias potential upon the base 51 of control circuit transistor 50 increases the conduction therethrough. As transistor 50 conducts heavier, the emitter 53 goes more negative, and, because of the direct connection, the emitter 33 of transistor 30 also goes more negative. Because of the "in-phase" relationship between wave-forms 49 and 70, the base 31 of transistor 30 is also going negative at this time but of a magnitude slightly more negative than that of the emitter 33. Therefore the potential difference between the base 31 and the emitter 33 becomes less, resulting in a reduction in the gain of transistor 30. As the gain of transistor 30 is reduced, the amplified signal level appearing across load resistor 75 is also reduced in magnitude, which, in turn, reduces the drive upon transistor 40. The impedance of the series diodes is arranged to be of a high value, so that the alternating current feed-back potential is most effective at the higher output potential magnitudes and less effective at the lower output potential magnitudes.

The conduction of transistor devices is determined, to a large extent, by ambient temperatures. Should transistor 40 tend to conduct more heavily, the potential of its collector 42 would tend to become less negative, or more positive. This more positive potential is applied to the base 51 of control circuit transistor 50 through the direct current feed-back circuit comprising line 39, series resistors 44 and 45, and line 46, as previously brought out. As the base of transistor 50 becomes more negative, the emitter 53 thereof also tends to become more positive, with the attendant increase of positive bias potential upon the emitter 33 of transistor 30. As the emitter 33 of transistor 30 becomes more positive, the direct current flow therethrough tends to increase. This increase in direct current flow through transistor 30 tends to make the potential of the collector 32 thereof more positive. As this more positive potential is applied directly to the base 41 of transistor 40, less drive is placed upon transistor 40, thereby tending to make it conduct less. Assuming the reverse to be true, that transistor 40 begins to conduct less, the potential at its collector 42 will tend to become more negative. This more negative potential is applied through the direct current feed-back loop, to the base 51 of control transistor 50. As the base 51 of transistor 50 becomes more negative, its emitter 53 also becomes more negative. Because the emitter 33 of first-stage amplifier transistor 30 is connected directly to the emitter 53 of control transistor 50, it also becomes more negative. This more negative potential upon the emitter 33 of transistor 30 tends to decrease the direct current flow therethrough, thereby tending to make the potential present upon its collector 32 more negative. This increased negative potential is applied directly to the base 41 of second-stage amplifier transistor 40, thereby tending to increase the flow of direct current therethrough. In this manner, this feed-back circuit tends to maintain the direct current flow through both transistors at a relatively constant value.

From this description it is apparent that through the medium of accurately controlling not only the gain but also the direct current flow through the transistors of the two amplifying stages, and by detecting the amplified differentiated signal at the time of reversal of polarity, an output signal pulse is produced, which corresponds accurately to the peak of an asymmetrical, direct current, electrical signal input wave form.

While a preferred embodiment of the present invention has been shown and described, it will be obvious to those skilled in the art that various modifications and substitutions may be made without departing from the spirit of the invention, which is to be limited only within the scope of the appended claims.

What is claimed is:

1. A peak detector device comprising in combination with a source of asymmetrical direct current electrical signals; first circuit means arranged to differentiate the asymmetrical direct current signals; first and second amplifying circuit means, each having at least input, output, and common electrodes, connected in cascade for amplifying said differentiated signal; output coupling circuit means included in the output electrode-common electrode circuit of said second amplifying circuit means; potential sensitive control circuit means included in the common electrode circuit of said first amplifying circuit means for automatically adjusting the gain thereof in response to changes in output potential; first feed-back circuit means for applying at least a portion of the potential of the said output electrode of said second amplifying circuit means to said control circuit means; second feed-back circuit means for applying at least a portion of the potential of said output coupling circuit means to said control circuit means; and a detector circuit means connected to said coupling circuit means for producing an output signal pulse as the amplified differentiated signal reverses polarity.

2. A peak detector device comprising in combination with a source of asymmetrical direct current electrical signals; first circuit means arranged to differentiate the asymmetrical direct current signals; first and second amplifying circuit means, each having at least input, output, and common electrodes, connected in cascade for amplifying said differentiated signal; output coupling circuit means included in the output electrode-common electrode circuit of said second amplifying circuit means; potential sensitive control circuit means included in the common electrode circuit of said first amplifying circuit means for automatically adjusting the gain thereof in response to changes in output potential; a direct current feed-back circuit means for applying at least a portion of the potential of the said output electrode of said second amplifying circuit means to said control circuit means; an alternating current feed-back circuit means for applying at least a portion of the potential of said output coupling circuit means to said control circuit means; and a detector circuit means connected to said coupling circuit means for producing an output signal pulse as the amplified differentiated signal reverses polarity.

References Cited in the file of this patent

UNITED STATES PATENTS

| | | |
|---|---|---|
| 2,419,548 | Grieg | Apr. 29, 1947 |
| 2,448,718 | Koulicovitch | Sept. 7, 1948 |
| 2,807,718 | Chressanthis et al. | Sept. 24, 1957 |
| 2,810,024 | Stanley | Oct. 15, 1957 |
| 2,816,964 | Giacoletto | Dec. 17, 1957 |